(12) United States Patent
Adolfson

(10) Patent No.: US 8,589,035 B2
(45) Date of Patent: Nov. 19, 2013

(54) METHOD FOR OPERATING A TRANSPORT VEHICLE, A TRANSPORT VEHICLE, A METHOD FOR CONTROLLLING OPERATION OF A WORK SITE AND A WORK SITE SYSTEM

(75) Inventor: Johan Adolfson, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 303 days.

(21) Appl. No.: 12/992,623

(22) PCT Filed: Jun. 17, 2008

(86) PCT No.: PCT/SE2008/000404
§ 371 (c)(1),
(2), (4) Date: Nov. 15, 2010

(87) PCT Pub. No.: WO2009/154518
PCT Pub. Date: Dec. 23, 2009

(65) Prior Publication Data
US 2011/0066336 A1 Mar. 17, 2011

(51) Int. Cl.
*G01G 19/08* (2006.01)
*B60W 10/04* (2006.01)

(52) U.S. Cl.
USPC .............................. 701/50; 700/213; 702/174

(58) Field of Classification Search
USPC ............ 701/50; 467/486, 509, 539; 700/213, 700/228
See application file for complete search history.

(56) References Cited

U.S. PATENT DOCUMENTS

| 3,826,398 | A | * | 7/1974 | Rivers, Jr. ..................... 220/1.5 |
| 4,158,416 | A | * | 6/1979 | Podesta ....................... 414/140.1 |
| 4,465,151 | A | | 8/1984 | Gorman et al. |
| 4,718,640 | A | * | 1/1988 | Flodin ............................. 254/45 |
| 4,809,794 | A | | 3/1989 | Blair et al. |
| 5,145,307 | A | * | 9/1992 | Smethwick et al. .......... 414/458 |
| 5,601,393 | A | * | 2/1997 | Waldschmitt ................ 414/498 |
| 5,678,977 | A | * | 10/1997 | Nordlund ...................... 414/458 |
| 5,803,502 | A | * | 9/1998 | Noll et al. ........................ 283/79 |
| 5,807,057 | A | * | 9/1998 | Nijenhuis ..................... 414/475 |
| 5,884,238 | A | * | 3/1999 | Noll et al. ..................... 702/150 |
| 6,389,982 | B1 | * | 5/2002 | Evensen ........................ 104/124 |
| 7,141,001 | B1 | | 11/2006 | Albanesi |
| 7,155,406 | B2 | * | 12/2006 | Kang ............................... 705/28 |
| 7,164,117 | B2 | * | 1/2007 | Breed et al. ................... 250/221 |
| 7,216,806 | B2 | * | 5/2007 | Kurita et al. .................. 235/385 |
| 7,277,784 | B2 | * | 10/2007 | Weiss .............................. 701/50 |
| 7,343,995 | B2 | * | 3/2008 | Fukuhara et al. ............. 180/168 |
| 7,993,573 | B2 | * | 8/2011 | Charczuk et al. ............. 266/232 |
| 2001/0030599 | A1 | * | 10/2001 | Zimmermann et al. ...... 340/426 |
| 2001/0041948 | A1 | * | 11/2001 | Ross et al. .................... 700/226 |
| 2003/0120455 | A1 | | 6/2003 | Sorrells et al. |

(Continued)

OTHER PUBLICATIONS

International Search Report for corresponding International Application PCT/SE2008/000404.

(Continued)

*Primary Examiner* — Russell Frejd
(74) *Attorney, Agent, or Firm* — WRB-IP LLP

(57) ABSTRACT

A method is provided for operating a transport vehicle provided with a container with due regard to a weight of a received material in the container. The method includes receiving information associated to the weight of the received material in the container from an external source, and in response to the weight information controlling operation of the vehicle.

21 Claims, 4 Drawing Sheets

(56) References Cited

U.S. PATENT DOCUMENTS

2006/0002762 A1* 1/2006 Crampton ................... 404/110
2006/0045700 A1* 3/2006 Siebers et al. ............... 414/509
2006/0070773 A1 4/2006 Dahl et al.
2007/0062422 A1* 3/2007 Wotring ................... 110/165 R
2010/0121541 A1* 5/2010 Behnke et al. ................. 701/50

OTHER PUBLICATIONS

International Preliminary Report on Patentability for corresponding International Application PCT/SE2008/000404.

* cited by examiner

METHOD FOR OPERATING A TRANSPORT VEHICLE, A TRANSPORT VEHICLE, A METHOD FOR CONTROLLLING OPERATION OF A WORK SITE AND A WORK SITE SYSTEM

BACKGROUND AND SUMMARY

The present invention relates to a method for operating a transport vehicle provided with a container with due regard to a weight of a received material in said container. The invention is further directed to such a transport vehicle.

The present invention further relates to a method for controlling operation of a work site comprising a work machine configured for loading material at an elevated position above the ground and a transport vehicle provided with a container, which is configured for receipt of material from the work machine. The invention is further directed to such a work site system.

The invention is particularly directed to a transport vehicle configured for transportation of heavy material, such as earth, stones or gravel in areas where there are no roads, for example for transports in connection with road or tunnel building, sand pits, mines and similar environments.

The invention will below be explained for a transport vehicle in the form of a work machine of the type of an articulated hauler. This application should however only be regarded as a preferred example of a transport vehicle and the invention can be realized for other types of transport vehicles, such as a dump truck with a rigid frame.

It is known with an onboard weight measurement apparatus in an articulated hauler. In one such known apparatus, the weight is measured via a strain gage rigidly attached to a bogie beam in a bogie arrangement. Information of the measured weight is presented for an operator on a screen in the cab. More specifically, the weight of the payload is monitored in order to prevent overloading of the specific type of articulated hauler.

However, such a weight measurement apparatus does not achieve a required accuracy and reliability in aggressive environments in the long run. More specifically, the strain gage is exposed to dust, dirt and material and would therefore be subjected to wear and possibly failure in this aggressive environment.

It is desirable to achieve a method for operating a transport vehicle with due regard to a load weight, which is reliable, cost-efficient and suitable for application in an aggressive environment.

According to an aspect of the present invention, a method comprises the step of receiving information associated to the weight of the received material in said container from an external source, and in response to the weight information controlling operation of said vehicle.

Thus, the transport vehicle receives the weight information from the external source. The external source is configured to measure the weight of the material loaded on the container of the transport vehicle and communicate the information to the transport vehicle. In this way, the transport vehicle does not have to be provided with an onboard weight measurement apparatus. Thus, the invention creates conditions for an improved operation in response to the weight of the loaded material on the container while maintaining a cost efficient transport vehicle.

Further, by automatically controlling operation of the transport vehicle in response to the received weight information, an improved operation can be achieved in that different vehicle systems can be controlled accordingly in order to improve fuel efficiency, operator comfort etc.

In a work site, a plurality of transport vehicles moves between different designations for loading and unloading material. Further, loading vehicles, such as wheel loaders and excavators are positioned at different loading designations for loading the transport vehicles.

According to a preferred embodiment, the method comprises the step of receiving information associated to the weight of the received material from a work machine loading the material on the container. Thus, according to this embodiment, the loading vehicle (for example the wheel loader) forms the external source mentioned above. A loading vehicle, such as a wheel loader, is more suitable for being equipped with an onboard weight measurement system than an articulated hauler, since a load sensor can easily be arranged in connection with the hydraulic system for operating a bucket.

Thus, the loading vehicle is provided with an onboard weight measurement apparatus and comprises means for sending a signal to the transport vehicle with said weight information. Especially, both purchase and control of a fleet of work machines (comprising both transport vehicles and wheel loaders) can be cost-efficient. The cost efficiency is particularly evident for work sites comprising a larger number of transport vehicles than loading vehicles.

A wheel loader provided with such an onboard weight measurement apparatus for preventing overloading thereof is known. Thus, the embodiment above creates conditions for achieving a value of the weight of the loaded material for controlling the operation of the transport vehicle by using a known weight measurement apparatus and only providing the transport vehicle with minor structural features, such as an antenna, and corresponding software in a controller.

According to a further development, the method comprises the step of receiving information associated to the weight of the received material directly from the work machine loading the material on the container. Preferably, there is a wireless communication between the loading vehicle and the transport vehicle. This wireless communication is at least one-way, from the loading vehicle to the transport vehicle. According to an alternative or complement, the weight information is sent from the loading vehicle to a central station on the work site for further distribution to the transport vehicle.

According to a preferred embodiment, the method comprises the step of, in response to the weight information, controlling operation of said vehicle when said vehicle transports the received material to a designation. Preferably, at least one vehicle system, such as a suspension system or a powertrain, is automatically controlled. In this way, operation of the transport vehicle can be significantly improved.

Preferably, the specific control of the transport vehicle is set to a standard mode (default mode) associated to an unloaded container. After loading, a mode corresponding to the weight of the load in the container is determined, and the vehicle is controlled accordingly on its way to the unloading destination.

According to a development of the last-mentioned embodiment, the method comprises the step of interrupting the control of the transport vehicle operation in response to the weight information when the vehicle has reached the designation. In this way, the transport vehicle is again controlled in accordance with an empty container (i.e. according to the default mode).

It is desirable to achieve transport vehicle provided with a container, which is configured for receipt of material, configured for controlling its operation with due regard to a load weight, which is reliable, cost-efficient and suitable for application in an aggressive environment.

According to an aspect of the present invention, a transport vehicle comprises a means for wirelessly receiving information associated to a weight of a material received in the container and a controller operatively connected to said receipt means, wherein the controller is adapted for controlling for at least one system in the vehicle in response to the weight information.

It is desirable to achieve a method for controlling operation of a work site comprising a work machine configured for loading material at an elevated position above the ground and a transport vehicle provided with a container, which is configured for receipt of material from the work machine, which is reliable, cost-efficient and suitable for application in an aggressive environment.

According to an aspect of the present invention, a method comprises the steps of weighing a material and loading the material on the container, wirelessly transmitting information associated to the weight of the material to said transport vehicle, and in response to the transmitted weight information controlling operation of said transport vehicle.

It is desirable to achieve work site system comprising a work machine configured for loading material at an elevated position above the ground and a transport vehicle provided with a container for receiving material from the work machine, which is reliable, cost-efficient and suitable for application in an aggressive environment.

According to an aspect of the present invention, a work machine comprises a means for weighing the material which is loaded on the container and a means for sending a signal with information associated to the weight of the material, said transport vehicle comprises a means for receiving a signal with information associated to the weight of the material received in the container, and a controller operatively connected to said receipt means, wherein the controller is adapted for controlling at least one system in the vehicle in response to the weight information.

Other advantageous features and functions of various embodiments of the invention are set forth in the following description and in the dependent claims.

BRIEF DESCRIPTION OF THE DRAWINGS

The invention will be explained below, with reference to the embodiments shown on the appended drawings, wherein.

DETAILED DESCRIPTION

Figure 1:
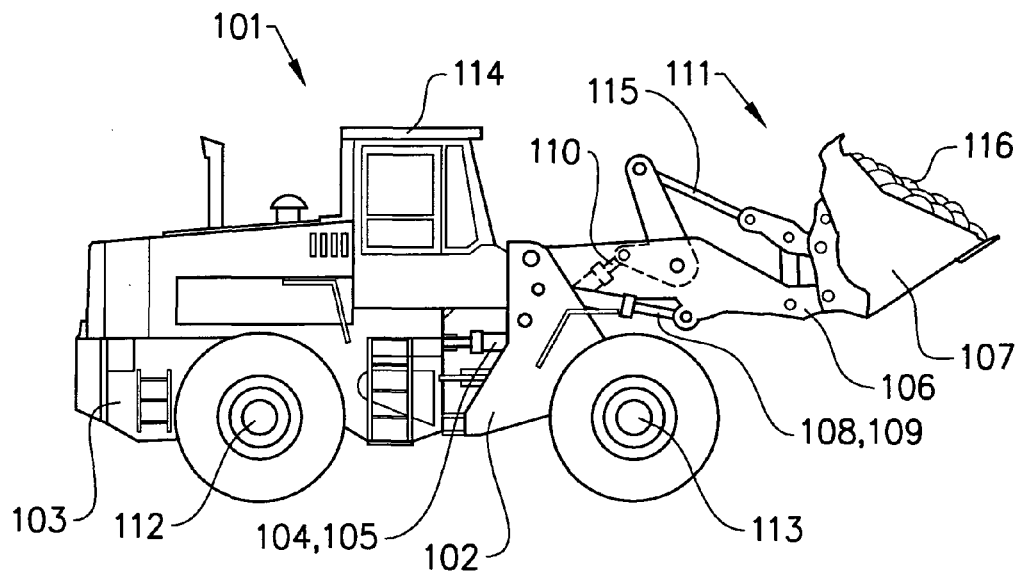
FIG. 1 shows a wheel loader in a side view.

FIG. 1 shows a frame-steered work machine constituting a wheel loader 101 in a side view. The body of the wheel loader 101 comprises a front body section 102 and a rear body section 103, which sections each has an axle 112,113 for driving a pair of wheels. The rear body section 103 comprises a cab 114. The body sections 102,103 are connected to each other in such a way that they can pivot in relation to each other around a vertical axis by means of two first actuators in the form of hydraulic cylinders 104,105 arranged between the two sections. The hydraulic cylinders 104,105 are thus arranged one on each side of a horizontal centerline of the vehicle in a vehicle traveling direction in order to turn the wheel loader 101.

The wheel loader 101 comprises an equipment 111 for handling objects or material. The equipment 111 comprises a load-arm unit 106 and an implement 107 in the form of a bucket fitted on the load-arm unit. A first end of the load-arm unit 106 is pivotally connected to the front vehicle section 102. The implement 107 is pivotally connected to a second end of the load-arm unit 106.

The load-arm unit 106 can be raised and lowered relative to the front section 102 of the vehicle by means of two second actuators in the form of two hydraulic cylinders 108,109, each of which is connected at one end to the front vehicle section 102 and at the other end to the load-arm unit 106. The bucket 107 can be tilted relative to the load-arm unit 106 by means of a third actuator in the form of a hydraulic cylinder 110, which is connected at one end to the front vehicle section 102 and at the other end to the bucket 107 via a link-arm system 115.

Figure 2:
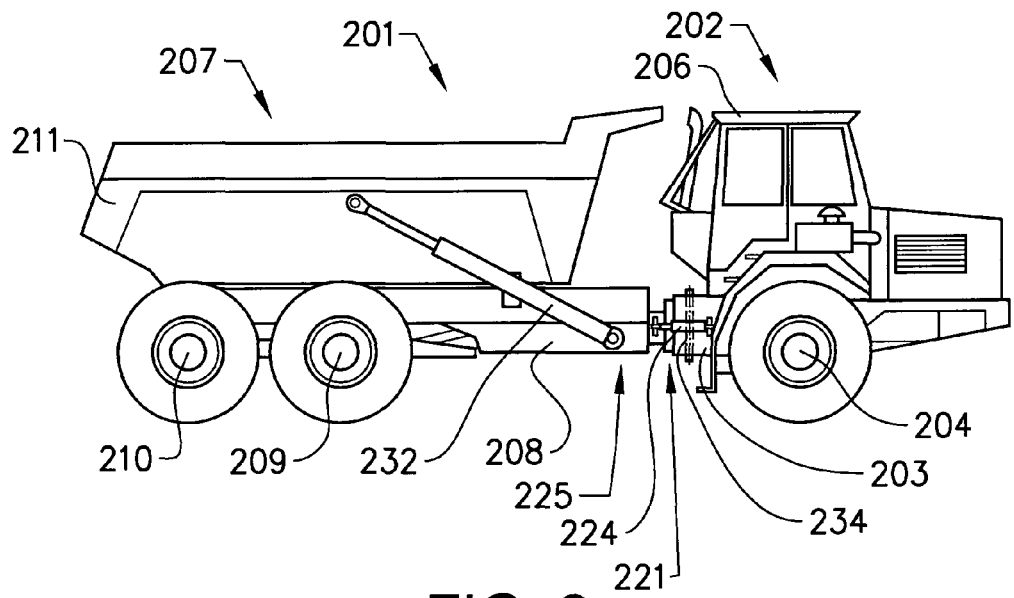
FIG. 2 shows an articulated hauler in a side view.

FIG. 2 shows an articulated hauler (also called frame-steered dumper) 201 in a side view. The articulated hauler comprises a front vehicle section 202 comprising a front frame 203, a front wheel axle 204 and a cab 206 for a driver. The articulated hauler 201 also comprises a rear vehicle section 207 comprising a rear frame 208, a front wheel axle 209, a rear wheel axle 210 and a tiltable container 211.

A first pivot joint 225 is adapted in order to allow the front frame 203 and the rear frame 208 to be pivoted relative to one another about an imaginary-longitudinal axis, that is to say an axis which extends in the longitudinal direction of the vehicle 201.

The front frame 203 is connected to the rear frame 208 via a second joint 221 which allows the front frame 203 and the rear frame 208 to be pivoted relative to one another about a vertical axis 234 for steering (turning) the vehicle. Actuators in the form of a pair of hydraulic cylinders 224 are arranged on respective sides of the rotary joint 221 for steering the vehicle. The hydraulic cylinders are controlled by the driver of the vehicle via a wheel and/or a joystick (not shown).

The container 211 is connected to the rear frame 208 via an articulation (not shown) at a rear portion of the rear frame. A pair of tilting cylinders 232 are connected to the rear frame 208 with a first end and connected to the platform body 211 with a second end. The tilting cylinders 232 are positioned one on each side of the central axis of the vehicle in its longitudinal direction. The platform body 211 is therefore tilted in relation to the rear frame 208 on activation of the tilting cylinders 232.

The container typically is in the form of a box with a closed bottom, side walls, a front wall and an open top. During dumping the contents slide out of the box onto the ground or into a waiting receptacle.

Figure 3:
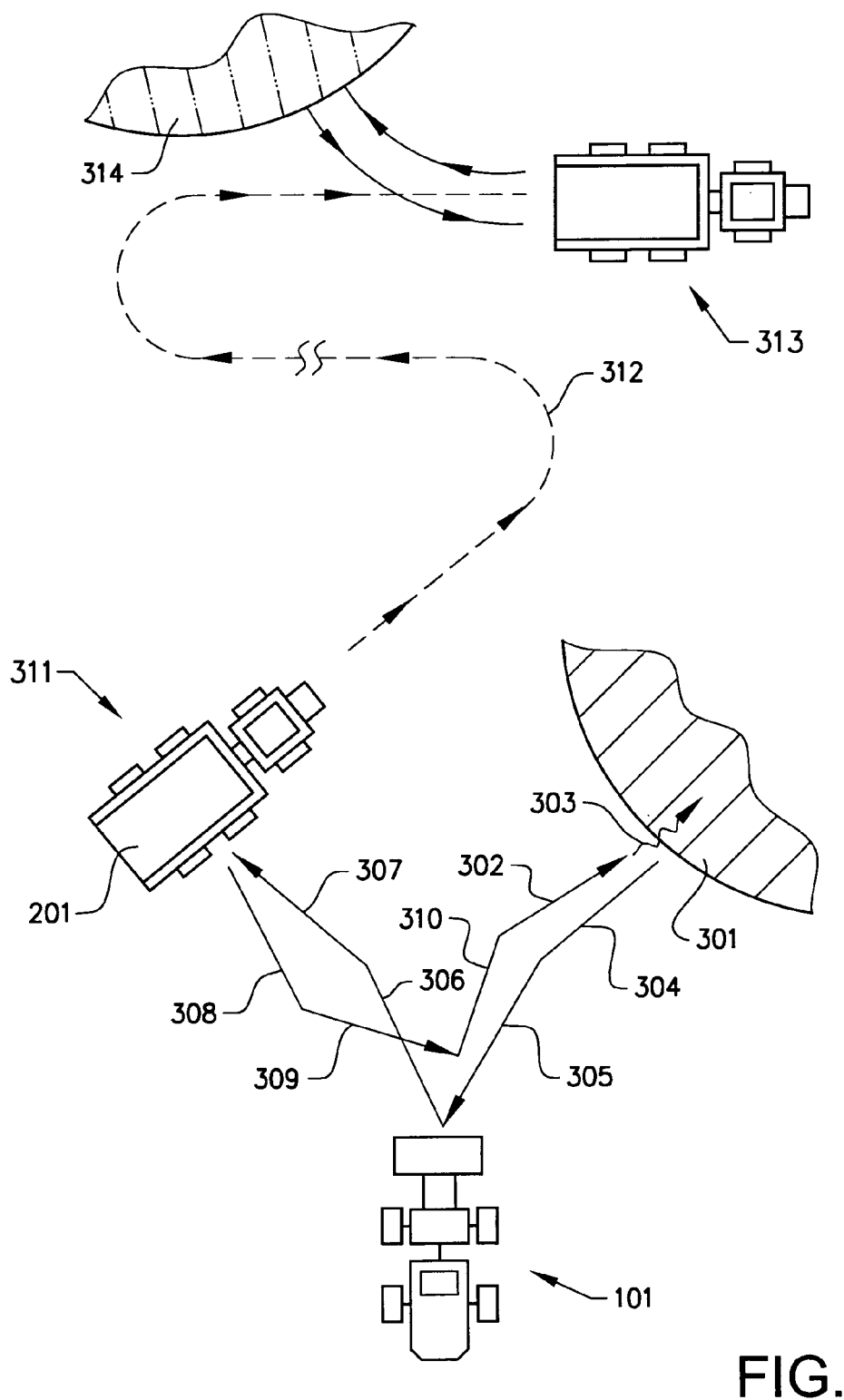
FIG. 3 shows an operation of the wheel loader and the articulated hauler on a work site,
FIG. 4 schematically shows a system for controlling operation of the articulated hauler.

With reference to FIG. 3, an operation of the wheel loader 101 and the articulated hauler 201 is shown in a work site. The wheel loader 101 is used to scoop up material from a loading position (excavating a natural ground 301) with the bucket 107 and unload it onto the container 211 of the articulated hauler 201.

FIG. 3 shows a driving pattern comprising a series of steps from excavation to loading onto the articulated hauler 201. Specifically, the wheel loader 101 travels forward, see arrow 302, to the natural ground 301 in a straight position, wherein the front and rear vehicle parts are in line. When it approaches the natural ground 301, it thrusts into the natural ground, see arrow 303. The lifting arm unit is raised, wherein the bucket 107 is filled with material from the natural ground.

When the excavation is finished, the wheel loader 101 is retreated from the excavating operation position at a high speed, see arrow 303 and the wheel loader is turned to the right (or to the left), see arrow 305. The wheel loader 101 then moves forward, see arrow 306, while turning hard to the left (or right), then straightens out the vehicle to travel to approach the articulated hauler 201, see arrow 307. The lifting arm unit 106 is raised, the bucket 107 tilted and the material is deposited on the container of the articulated hauler. When a loading operation of the dump truck 320 is finished, the wheel loader 101 moves away in reverse from the articulated hauler 201, see arrow 308, turns 309 to a stop position and is driven forwards again 310 towards the natural ground 301. The operation of the wheel loader 101 is repeated until the container 211 is filled.

When the container 211 is filled up with material, the articulated hauler 201 is moved from its loading position 311 to a designation 313, in the form of an unloading position, via a path 312. The contents in the container 211 are unloaded at a position 314 by tilting the container 211.

Figure 4:
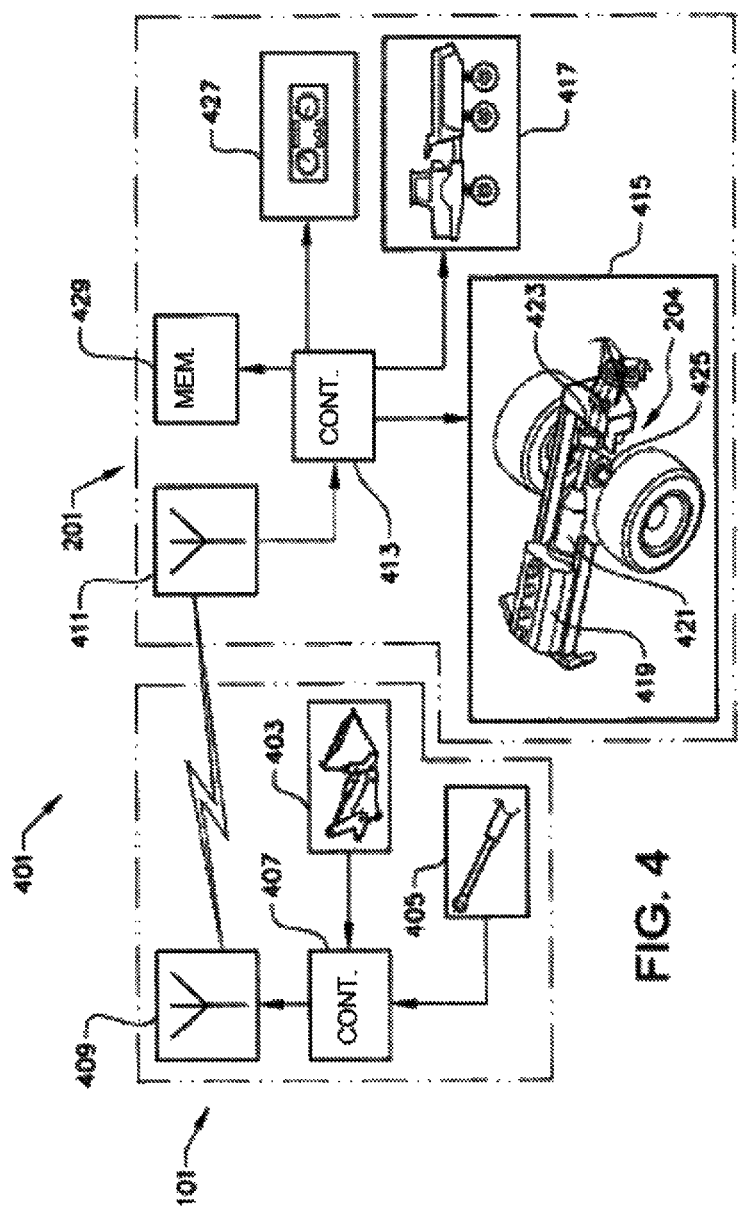

FIG. 4 shows a system 401 for controlling operation of the articulated hauler. The system 401 comprises the wheel loader 101 and the articulated hauler 201.

The wheel loader 101 comprises means 403, 405, 407 for determining a weight of the material in the bucket 107. Said weight determination means comprises at least one sensor 403 adapted for sensing a position of the bucket 107. More specifically, a first position sensor is adapted to sense a vertical position of the bucket 107, and more precisely the angular position of the lift arm 106 relative to the frame 102. A second sensor is adapted to sense an angular position of the bucket 107 relative to the lift arm 106. The first and second sensors may for example be formed by angular sensors arranged in the respective pivot joint, or by linear sensors arranged to detect a linear displacement of the respective cylinder.

Said weight determination means further comprises a sensor 405 adapted for sensing a pressure in the hydraulic system, which is indicative of the load exerted on the system. The sensor 405 is preferably adapted to sense a pressure in the lift cylinder 108,109.

Said weight determination means further comprises a controller 407, which is adapted to receive signals with position and pressure information from the sensors 403, 405. The controller 407 comprises software for determining a weight of the material based on the information in the sensor signals and producing a corresponding weight signal.

The wheel loader 101 further comprises a means 409 for sending a weight signal produced by the controller 407. The sending means 409 preferably comprises an antenna, which is operatively connected to the controller 407 and configured for transmitting electromagnetic waves, such as radio waves.

The articulated hauler 201 comprises a means 411 for receiving the weight signal from the wheel loader 101. The receiving means 411 preferably comprises an antenna configured for receiving the electromagnetic waves.

The articulated hauler 201 further comprises a controller 413, which is operatively connected to the antenna 411 for receiving the weight signal. The controller 411 comprises software for determining and producing an output signal to at least one vehicle system 415, 417 or vehicle component for controlling the same.

A first vehicle system is exemplified by a powertrain 415. A power source in the form of an internal combustion engine (a diesel engine) 419 is adapted for propulsion of the hauler 201. The powertrain further comprises a main gearbox 421 in the form of an automatic gearbox, which is operationally connected to an output shaft from the engine 419. The powertrain further comprises an intermediate gearbox 423 (transfer gear box) for distributing driving power between the front axle 204 and the rear axles 209,210 (see FIG. 2).

A first drive shaft (propeller shaft) extends in the longitudinal direction of the vehicle and is operationally connected between the transfer gearbox 423 and a central gear 425 (differential gear) in the wheel axle 204. A pair of transverse drive shafts (stick axles) extends in opposite directions from the central gear 425. Each of the transverse drive shafts drives a wheel.

A second vehicle system is exemplified by a suspension system 417. The exemplified suspension system 417 is adapted to suspend the frame 203,208 on the axles 204,209, 210. Specifically, the suspension system 417 is configured for a continuous control in response to turns, slopes etc.

The controller 411 is further adapted to produce an output signal to an operator display means 427 in order to indicate the loaded weight for the driver. The controller 411 is further adapted to produce an output signal to an electronic storage in the form of a memory 429 for storing weight information regarding an individual operator, a work shift etc.

Embodiment examples of a method for controlling the articulated hauler will be described below.

Figure 5:
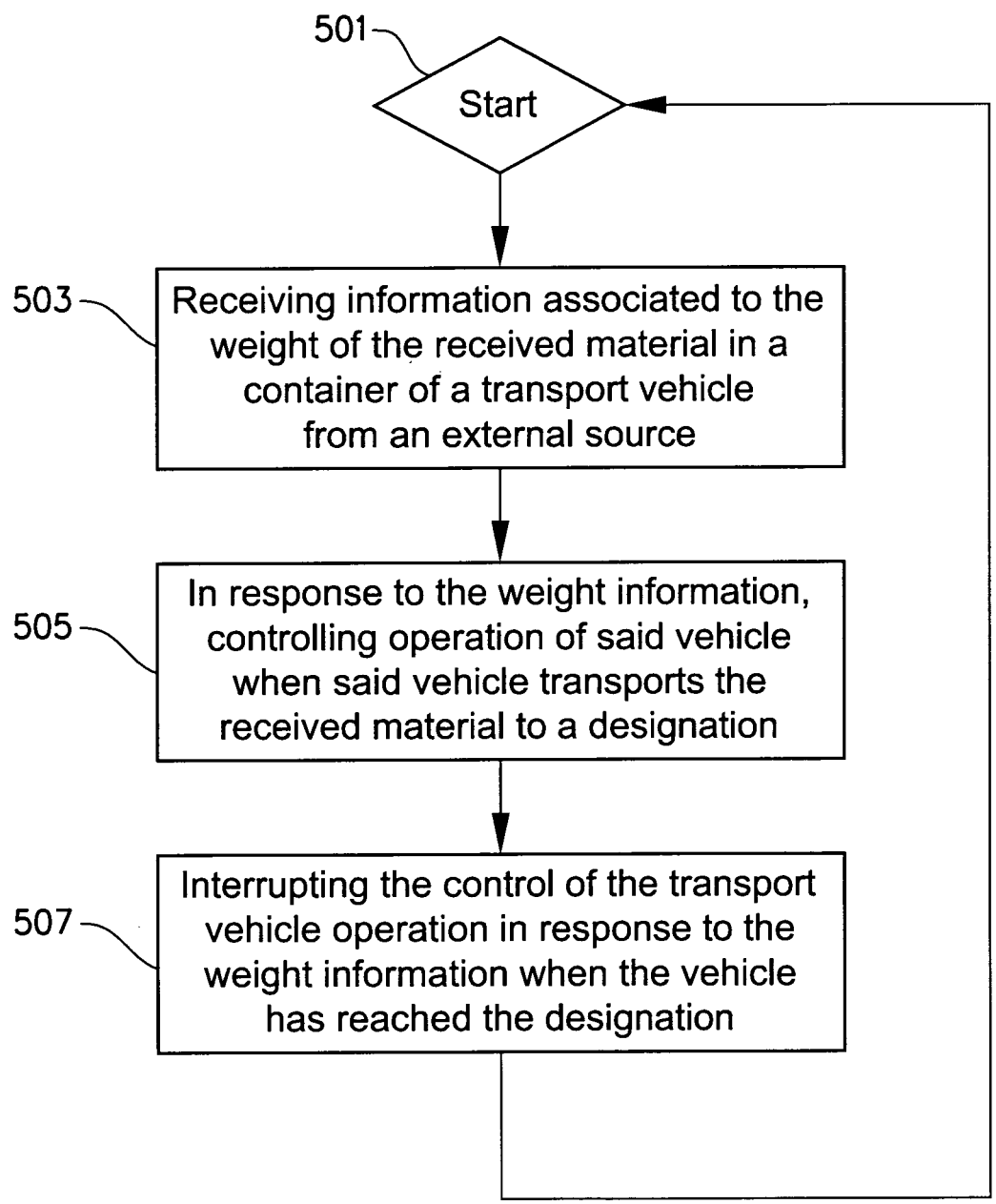
FIG. 5 shows a flow chart of an embodiment example of the invention.

According to a first example, see FIG. 5, the method starts in box 501. The method comprises the step of receiving information associated to the weight of the received material in said container from an external source 503, and in response to the weight information controlling operation of said vehicle 505. Specifically, the method comprises the step of receiving information associated to the weight of the received material from the work machine 101 loading the material on the container. Preferably, the method comprises the step of wirelessly receiving information associated to the weight of the received material.

The method further comprises the step of, in response to the weight information, controlling operation of said vehicle when said vehicle transports the received material to a designation 313, see the travel path 312 in FIG. 3. More specifically, the method further comprises the step of controlling the suspension system 417 of the transport vehicle in response to the weight information. The method preferably comprises the step of automatically controlling operation of said transport vehicle in response to the weight information.

The method further comprises the step of interrupting the control of the transport vehicle operation in response to the weight information 507 when the vehicle has reached the designation 313. Especially, the method comprises the step of interrupting the control of the transport vehicle operation in response to the weight information when the material has been unloaded at the designation. The method then goes back to the block 501 for starting the procedure again in a subsequent loading phase.

In addition to the automatic control of a vehicle system, the method preferably comprises the step of presenting information associated to the weight for a driver of said transport vehicle for manually controlling operation of said vehicle in response thereto. Preferably, information is shown on a display in the cab. For example, the driver may get notice of when the container is completely filled, or filled to a desired weight limit, wherein he can immediately start forwarding the transport vehicle to the desired destination.

According to a second embodiment example of the method, which may be regarded as an alternative, or complement to the first embodiment example, the method comprises the step of controlling the powertrain 415 of the transport vehicle in response to the weight information. More specifically, the method comprises the step of controlling the power source 419 of the transport vehicle in response to the weight information. More specifically, the method comprises the step of selecting an engine curve from a plurality of available curves and controlling an internal combustion engine in accordance with the selected engine curve.

According to an alternative or complement to any of the embodiment examples described above, the method comprises the step of selecting a gear change mode from a plurality of available gear change modes and controlling the gearbox 421 in accordance with the selected gear change mode.

According to a further alternative or complement to any of the embodiment examples described above, the method comprises the step of controlling a differential gear of the transport vehicle in response to the weight information.

According to a further alternative or complement to any of the embodiment examples described above, the method comprises the step of controlling a cruise control function in the transport vehicle in response to the weight information.

According to a further alternative or complement to any of the embodiment examples described above, the method comprises the step of storing the weight information in the electronic storage 429 associated to the individual driver of said transport vehicle.

Further, according to an alternative, the method comprises the step of receiving the material in a plurality of loading steps and in association with each loading step receiving information associated to a weight of the received material in each step. According to a second alternative, the method comprises the step of receiving the material in a plurality of loading steps and in association with a last loading step receiving information associated to a weight of the totally received material from all the steps. A loading step represents a fill of the bucket of the work machine. Accordingly, the method comprises the step of wirelessly receiving at least one signal with information associated to a weight of the received material.

The invention is not in any way limited to the above described embodiments, instead a number of alternatives and modifications are possible without departing from the scope of the following claims.

According to a further alternative or complement to any of the embodiment examples described above, a signal is sent to the driver for alerting him when the container is filled to a desired limit. The driver can then immediately start the transport of the material to the destination. Thus, the loading cycle time can be reduced.

According to a further alternative or complement to any of the embodiment examples described above, the gearbox is automatically put in a forward gear when the container is filled to a desired limit. In this way, the loading cycle time can be reduced.

According to a further alternative or complement to any of the embodiment examples described above, a brake that is actuated during the loading phase is automatically released when the container is filled to a desired limit. In this way, the loading cycle time can be reduced.

The invention claimed is:

1. A method for operating a transport vehicle provided with a container with regard to a weight of a received material in the container, the method comprising
receiving information associated to the weight of the received material in the container from a work machine loading the material on the container,
in response to the weight information controlling operation of the vehicle.

2. A method according to claim 1, wherein the method comprises the step of in response to the weight information, controlling, operation of the vehicle when the vehicle transports the received material to a designation.

3. A method according to claim 2, wherein the method comprises the step of interrupting the control of the transport vehicle operation in response to the weight information when the vehicle has reached the designation.

4. A method according to claim 2, wherein the method comprises the step of interrupting the control of the transport vehicle operation in response to the weight information when the material has been unloaded at the designation.

5. A method according to claim 1, wherein the method comprises the step of wirelessly receiving information associated to the weight of the received material.

6. A method according to claim 1, wherein the method comprises the step of automatically controlling operation of the transport vehicle in response to the weight information.

7. A method according to claim 1, wherein the method comprises the step of presenting information associated to the weight for a driver of the transport vehicle for manually controlling operation of the vehicle in response thereto.

8. A method according to claim 1, wherein the method comprises the step of controlling a suspension system of the transport vehicle in response to the weight information.

9. A method according to claim 1, wherein the method comprises the step of controlling a powertrain of the transport vehicle in response to the weight information.

10. A method according to claim 1, wherein the method comprises the step of controlling a power source of the transport vehicle in response to the weight information.

11. A method according to claim 10; wherein the method comprises the step of selecting an engine curve from a plurality of available curves and controlling an internal combustion engine in accordance with the selected engine curve.

12. A method according to claim 1, wherein the method comprises the step of selecting a gear change mode from a plurality of available gear change modes and controlling a gearbox in accordance with the selected gear change mode.

13. A method according to claim 1, wherein the method comprises the step of controlling a differential gear of the transport vehicle in response to the weight information.

14. A method according to claim 1, wherein the method comprises the step of controlling a cruise control function in the transport vehicle in response to the weight information.

15. A method according to claim 1, wherein the method comprises the step of storing the weight information in an electronic storage associated to the individual driver of the transport vehicle.

16. A transport vehicle provided with a container, which is configured for receipt of material, the transport vehicle comprising means for wirelessly receiving information from a machine loading material on the container associated to a weight of a material received in the container and a controller operatively connected to the receipt means, wherein the controller is arranged to control at least one system in the vehicle in response to the weight information.

17. A transport vehicle according to claim 16, wherein the vehicle is an articulated hauler.

18. A method for controlling operation of a work site comprising a work machine configured for loading material at an elevated position above the ground and a transport vehicle provided with a container, which is configured for receipt of material from the work machine, the method comprising weighing a material prior to loading the material on the container to obtain information associated with the weight of the material and thereafter loading the material on the container, wirelessly transmitting the information associated to the weight of the material to the transport vehicle, and in response to the transmitted weight information controlling operation of the transport vehicle.

19. A work site system comprising a work machine configured for loading material at an elevated position above the ground and a transport vehicle provided with a container for receiving material from the work machine, wherein the work machine comprises means for weighing the material which is loaded on the container and a means for sending a signal with information associated to the weight of the material, the transport vehicle comprises means for receiving a signal with information associated to the weight of the material operatively connected to the receipt means, wherein the controller is arranged to control at least one system in the vehicle in response to the weight information.

20. A work site system according to claim 19, wherein the vehicle is an articulated hauler.

21. A work site system according to claim 19, wherein the work machine is a wheel loader.

* * * * *